(12) United States Patent
Sung et al.

(10) Patent No.: US 7,019,121 B2
(45) Date of Patent: Mar. 28, 2006

(54) PROCESS FOR CONDITIONING AZO PIGMENTS

(75) Inventors: Edward H. Sung, Cincinnati, OH (US); George H. Robertson, Loveland, OH (US); Humberto A. Velasquez, Cincinnati, OH (US)

(73) Assignee: Sun Chemical Corporation, Parsippany, NJ (US)

(*) Notice: Subject to any disclaimer, the term of this patent is extended or adjusted under 35 U.S.C. 154(b) by 79 days.

(21) Appl. No.: 10/751,162

(22) Filed: Dec. 31, 2003

(65) Prior Publication Data

US 2005/0139128 A1    Jun. 30, 2005

(51) Int. Cl.
*C09B 67/20* (2006.01)
*C09D 11/02* (2006.01)

(52) U.S. Cl. .................. 534/588; 106/31.8; 106/496

(58) Field of Classification Search ................ 534/588; 106/31.8, 496

See application file for complete search history.

(56) References Cited

U.S. PATENT DOCUMENTS

| | | | | |
|---|---|---|---|---|
| 3,947,287 A | | 3/1976 | Belde et al. ................ 106/413 |
| 4,167,503 A | * | 9/1979 | Cipriani ..................... 524/297 |
| 4,476,052 A | | 10/1984 | Hunger et al. .............. 534/575 |
| 4,909,853 A | | 3/1990 | Wienkenhover et al. .... 106/503 |
| 5,298,535 A | | 3/1994 | Kammer ..................... 524/190 |
| 5,922,123 A | | 7/1999 | Sandefur et al. ............ 106/493 |
| 6,013,126 A | | 1/2000 | Shannon et al. ............ 106/493 |

* cited by examiner

*Primary Examiner*—Fiona T. Powers
(74) *Attorney, Agent, or Firm*—Sidney Persley

(57) ABSTRACT

A process for conditioning azo pigment with surfactants of ethoxylate alkyl phenols in the presence of a strong alkali in the aqueous condition.

20 Claims, No Drawings

PROCESS FOR CONDITIONING AZO PIGMENTS

FIELD OF THE INVENTION

This invention relates to the conditioning of azo pigments.

BACKGROUND OF THE INVENTION

Organic azo pigments have been widely used in the paint industry based on range of color display and relative low cost. However, organic pigments in the form initially obtained after chemical synthesis, i.e. crude pigments, are generally unsuitable for immediate use as pigments. Most of the crude pigments have small particle size and are transparent in color, resulting in poor lightfastness. These pigments therefore often require additional treatment during preparation to modify particle size and particle shape and/or crystal structure to increase opacity and/or improve lightfastness. Such methods include heating the crude pigments in the presence of a solvent or in an aqueous medium at a higher temperature and, quite often, placing the crude pigment in a pressure reactor to achieve the desirable particle size.

U.S. Pat. No. 4,476,052 discloses a process for the preparation of azo pigment by heating the pigment obtained after coupling in an organic solvent at 80–180° C. The addition of such organic solvent improves opacity for the pigment, however, the flammability of the solvent and its recovery not only increases the processing cost but also renders handling of the pigment inconvenient and a potential safety hazard in most traditional azo plants.

Thus, there exists a need for an efficient and effective process to prepare an azo pigment whereby the azo pigment has strong lightfastness, large particle size, and opacity without requiring a flammable solvent component.

SUMMARY OF THE INVENTION

It has now been found that the above objectives can be realized by employing a process for conditioning azo pigment with surfactants of ethoxylate alkyl phenols at the presence of strong alkali in the aqueous condition.

The present invention also provides a process for conditioning azo pigment having improved dispersibility and opacity comprising (a) preparing azo pigment through conventional coupling technique in water;

(b) treating azo pigment slurry with surfactants of ethoxylate alkyl phenols in the presence of strong alkali;

(c) heating the aqueous slurry at a temperature of about 95–100° C.; and (d) isolating the conditioned azo pigment Other objects and advantages of the present invention will become apparent from the following description and appended claims.

DETAILED DESCRIPTION OF THE INVENTION

The present invention generally provides a process for conditioning an azo pigment in which the pigment is treated with surfactants of ethoxylated alkyl phenols in the presence of a strong alkali in the aqueous condition. The method achieves improved opacity in the pigment without the further need for processing.

Organic pigments suitable for use in the present invention include, but are not limited to naphthol reds, monoazo yellows and oranges, and diaryliade yellows and oranges.

Surfactants suitable for use in the present invention include, but are not limited to ethoxylated alkyl phenols such as ethoxylate alkyl phenols such as nonylphenoxy poly(ethyleneoxy)ethanol and octylphenoxy poly(ethyleneoxy)ethanol.

The present invention also includes strong alkali suitable for use in the present invention such as, but not limited to, sodium hydroxide, potassium hydroxide, lithium hydroxide and ammonium hydroxide. It is preferred that the strong alkali be sodium hydroxide.

The amount of strong alkali is essential to the particle growth of azo pigments, which directly correlates to opacity. In one embodiment of the present invention, at least two to ten equivalent moles of alkali per mole of pigment are added during the conditioning process. It is preferred that about four to about six equivalent moles of alkali per mole of pigment are added during the conditioning process of the present invention.

The surfactant may be added during the conditioning process of the present invention in an amount of about 2–12 wt. % based on the pigment. It is preferred that about 3–10 wt. % of surfactant be added during the conditioning process of the present invention.

In the past, when conventional conditioning of a pigment in aqueous solution was performed, the opacity of the resulting product was limited by the boiling temperature of water and therefore a pressure reactor was often required in order to achieve desirable opacity. It has now been found that an azo pigment can be opacified by treating azo pigment with surfactants of ethoxylate alkyl phenols at the presence of strong alkali in the aqueous condition without using a pressure reactor.

The process of the present invention is characterized by coupling the diazo with excess coupler at temperature of 0–10° C., preferably at about 5° C. The resulting slurry is then heated with ethoxylate alkyl phenol in the presence of strong alkali to give opaque, strong and easily dispersible product.

After the addition of alkali and surfactant, the pigment slurry is heated to 0–100° C., preferably between 95–100° C. The length of heating is dependant on the desirable particle size required. Generally, longer heating produces larger and more opaque pigment.

The pigments of the invention exhibit very good tinctorial strength and are readily dispersible. They are suitable for plastics, printing inks, coating applications and paints such as solvent based, water based and enamel based paints.

The pigments of the present invention are further illustrated by the following non-limiting examples in which all parts and percentages are by weight, unless otherwise indicated.

EXAMPLE 1

A diazo solution was prepared by adding para-chloro-ortho-nitroaniline (430 grams) and concentrated hydrochloric acid (1100 grams) to water (9000 ml). The mixture was cooled to 0–5° C. and the amine was diazotized by adding a mixture of sodium nitrite (192 grams) and water (600 grams). The mixture was stirred for three hour. A sulfanic acid solution was added to remove the excess nitrite and then charcoal (3 grams) and celite (3 grams) were added and mixed for 15 minutes. The resulting diazo solution was clarified.

A coupler solution was prepared by dissolving 5-acetoacetylamino-benzimidazolone (610 grams) in a solution containing water, (20000 ml) and sodium hydroxide (1200 grams). Charcoal (9 grams) and celite (6 grams) were added and stirred for one hour, then clarified. Sodium hydroxide (194 grams) and acetic acid (1450 grams; 56%) were added and the pH was adjusted to 6.0. The resulting coupler solution was cooled to 5–8° C.

The diazo solution was added to the coupler solution over a period of 1.5 hours resulting in a pigment slurry which was stirred for one hour. Sodium hydroxide (290 grams) was added and the mixture was heated to 95–100° C. and maintained for 15 minutes. Nonylphenoxy poly(ethyleneoxy)ethanol (61 grams) and additional sodium hydroxide (194 grams) were added and the temperature was maintained at 95–100° C. for 6 hours. The mixture was cooled to 70° C. and filtered to obtain a presscake pigment.

The presscake was washed with water to lower conductivity and dried, yielding an orange pigment with excellent fastness to light and weathering, high covering power, good spreading capability and high brilliancy.

EXAMPLE 2

The pigment of Example 1 was mixed into an acrylic enamel paint with the components set forth in Table 1 below.

TABLE 1

| Component | 50:50 tint | 95:5 tint |
|---|---|---|
| Pigment(a) | 3.4 g | 1.5 g |
| Acrylic Resin | 39 g | 28.2 g |
| Xylene | 54 g | 43.1 g |
| Titanium Dioxide | 3.3 g | 27.1 g |
| Cobalt Dryer | 0.3 g | 0.1 g |

(a)Pigment of Example 1 and also conventional pigment Sunfast 271-9136, manufactured by Sun Chemical, Ft. Lee, NJ.

The acrylic enamel paints were compared and measured using a Spectraflash SF600 Plus equipped with Colortools QC, version 3.0, manufactured by Datacolor International of Applied Systems, Inc., Charlotte, N.C. The results are set forth in Table 2 below.

TABLE 2

|  | DE* | DL* | Da* | Db* | DC* | DH* | Color Strength |
|---|---|---|---|---|---|---|---|
| 50:50 Tint pf Example 1 Pigment | 2.55 | 0.64 | 0.03 | 2.47 | 1.61 | 1.87 | 103.74 |
| 95:5 Tint of Example 1 Pigment | 2.97 | 0.05 | 0.28 | 2.96 | 2.09 | 2.12 | 104.45 |

The acrylic enamel paint containing more of the pigment prepared according to the present invention was more opaque in masstone versus conventional pigment.

EXAMPLE 3

A diazo solution prepared according to Example 1 was added over a period of 1.5 hours to a couple solution prepared according to Example 1 and the resulting slurry was stirred for one hour. Sodium hydroxide (484 grams) was added and the mixture was heated to 95–100° C. and maintained for 15 minutes. Nonylphenoxy poly(ethyleneoxy)ethanol (61 grams) was added and the mixture temperature was maintained at 95–100° C. for another 6 hours. The mixture was cooled to 70° C. and filtered to obtain a presscake pigment.

The presscake was washed with water to lower conductivity and dried, yielding an orange pigment with excellent fastness to light and weathering, high covering power, good spreading capability and high brilliancy.

EXAMPLE 4

The pigment of Example 3 was mixed into a 50:50 tint and a 95:5 tint acrylic enamel paint using the same components and weight percentages as set forth in Example 2 (Table 1). The acrylic enamel paints were compared and measured according to the method of Example 2. The results are set forth in Table 3 below.

TABLE 3

|  | DE* | DL* | Da* | Db* | DC* | DH* | Color Strength |
|---|---|---|---|---|---|---|---|
| 50:50 Tint of Example 3 Pigment | 1.30 | −0.24 | −1.00 | −0.79 | −1.28 | 0.02 | 98.35 |
| 95:5 Tint of Example 3 Pigment | 1.76 | 0.57 | −1.38 | −0.94 | −1.67 | 0.09 | 95.88 |

The acrylic enamel paint containing more of the pigment prepared according to the present invention was more opaque in masstone and had a higher color strength than that containing conventional pigment.

EXAMPLE 5

A diazo solution was prepared by adding para-nitroaniline (109.2 grams) and concentrated hydrochloric acid (266.8 grams) to water (2400 ml). The mixture was cooled to 0–2° C. and then diazotized by adding a mixture of sodium nitrite (51 grams) and water (100 grams). The mixture was stirred for two hours. A sulfamic acid solution was added to remove the excess nitrite and then charcoal (1 gram) and celite (1 gram) were added and stirred for 20 minutes. The resulting diazo solution was clarified.

A coupler solution was prepared by dissolving 5-acetoacetylamino-benzimidazolone (155 grams) in a solution containing water, (5100 ml) and sodium hydroxide (76 grams). Charcoal (1 gram) and celite (1 gram) were added and then clarified. Sodium hydroxide (101 grams) and acetic acid (200 grams; 70%) were added and the resulting coupler solution was cooled to 5° C.

The diazo solution was added to the coupler solution over a period of 1.5 hours resulting in a pigment slurry which was stirred for 30 minutes. The pH of the pigment slurry was adjusted to 8.0 with a diluted sodium hydroxide solution (25%). The pigment slurry was heated to 95–100° C. and maintained for 15 minutes. Sodium hydroxide (39 grams) and nonylphenoxy poly(ethyleneoxy)ethanol (8 grams) were added and the temperature was maintained at 95–100° C. for 6 hours. The mixture was cooled to 70° C. and filtered to obtain a presscake pigment.

The presscake was washed with water to lower conductivity and dried, yielding an orange pigment with excellent fastness to light and weathering, high covering power, good spreading capability and high brilliancy.

EXAMPLE 6

The pigment of Example 5 was mixed into an acrylic enamel paint of the components set forth in Table 5 below.

TABLE 5

| Component | 50:50 tint | 95:5 tint |
|---|---|---|
| Pigment[b] | 3.4 g | 1.5 g |
| Acrylic Resin | 39 g | 28.2 g |
| Xylene | 54 g | 43.1 g |
| Titanium Dioxide | 3.3 g | 27.1 g |
| Cobalt Dryer | 0.3 g | 0.1 g |

[b]Pigment of Example 1 and also conventional pigment Clariant H5G-70, manufactured by Clariant, Coventry, RI.

The acrylic enamel paints were compared and measured according to the method of Example 2 and the results are set forth in Table 6 below.

TABLE 6

| | DL* | Da* | Db* | Color Strength |
|---|---|---|---|---|
| 50:50 Tint of Example 5 Pigment | 1.41 | 0.51 | 3.64 | 99.57 |
| 95:5 Tint of Example 5 Pigment | −0.14 | 0.87 | 4.20 | 100.99 |

The acrylic enamel paint containing more of the pigment prepared according to the present invention was more opaque in masstone and had a higher color strength than that containing conventional pigment.

The invention has been described in terms of preferred embodiments thereof, but is more broadly applicable as will be understood by those skilled in the art. The scope of the invention is only limited by the following claims.

What is claimed is:

1. A process for conditioning an organic azo pigment comprising:
    (a) preparing an aqueous slurry of an azo pigment in the presence of a surfactant of ethoxylate alkyl phenols and an alkali; and
    (b) heating said slurry at a temperature above about 70° C. resulting in conditioned organic azo pigment.

2. The process of claim 1, wherein the step of preparing the aqueous slurry comprises the steps of:
    (a) coupling a diazo with excess coupler at a temperature of at least about 0–10 C to form an azo pigment slurry;
    (b) adding an alkali to the pigment slurry;
    (c) heating the slurry and alkali to a temperature above about 70° C.; and
    (d) adding additional alkali and a surfactant of ethoxylate alkyl phenols to the slurry.

3. The process of claim 1, wherein said azo pigment is selected from the group consisting of naphthol reds, monoazo yellows, monoazo oranges, diarylide yellows and diarylide oranges.

4. The process of claim 1, wherein said surfactant is selected from the group consisting of nonylphenoxy poly (ethyleneoxy)ethanols and octylphenoxy poly(ethyleneoxy) ethanols.

5. The process of claim 1, wherein the surfactant is about 2 wt. % to about 12 wt. % of the pigment.

6. The process of claim 5, wherein the surfactant is about 3 wt. % to about 10 wt. % of the pigment.

7. The process of claim 1, wherein said alkali is selected from the group consisting of sodium hydroxides, potassium hydroxides, lithium hydroxides and ammonium hydroxides.

8. The process of claim 1, wherein the alkali amount is at least about 2 equivalent mole of alkali per mole of the azo pigment.

9. The process of claim 8, wherein the alkali amount is at least about 2 to about 10 equivalent mole of alkali per mole of the azo pigment.

10. The process of claim 9, wherein the alkali amount is at least about 4 to about 6 equivalent mole of alkali per mole of the azo pigment.

11. The process of claim 1, wherein the heating step is done at a temperature of above 80° C.

12. The process of claim 11, wherein the heating step is done at a temperature of about 90° to about 100 C.

13. The process of claim 12, wherein the heating step is done at a temperature of about 95° to about 100 C.

14. The process of claim 1, wherein the pigment is monoazo yellow and the amount surfactant is about 6 wt. % of the pigment.

15. The process of claim 1, wherein the pigment is napthol red and the amount surfactant is about 10 wt. % of the pigment.

16. A azo pigment conditioned by the process of claim 1.

17. A printing ink that comprises an azo pigment conditioned by the process of claim 1.

18. A coating that comprises an azo pigment conditioned by the process of claim 1.

19. The coating of claim 18, wherein the coating is selected from the group consisting of solvent-based paints, water-based paints, and enamel-based paints.

20. The coating of claim 19 wherein the coating is an enamel-based paint.

* * * * *